Jan. 26, 1937.  C. R. NORTHRUP ET AL  2,068,960
AUTOMOBILE LUGGAGE CARRIER
Filed Dec. 18, 1935
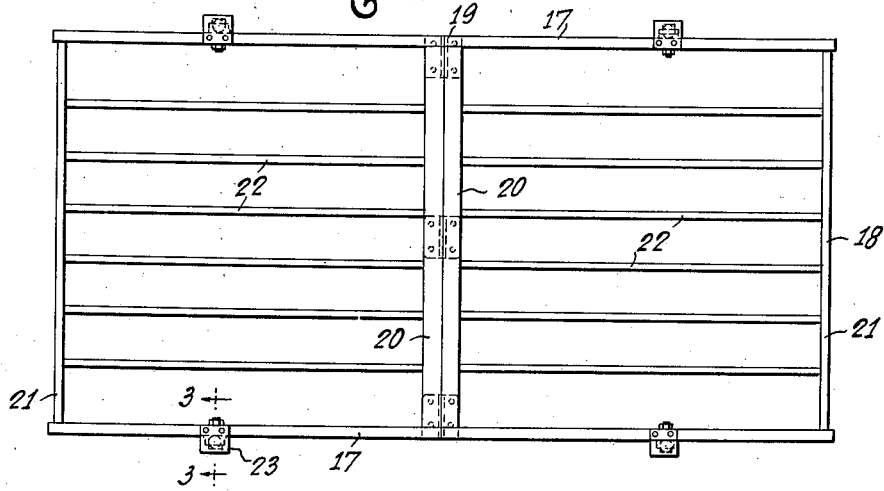
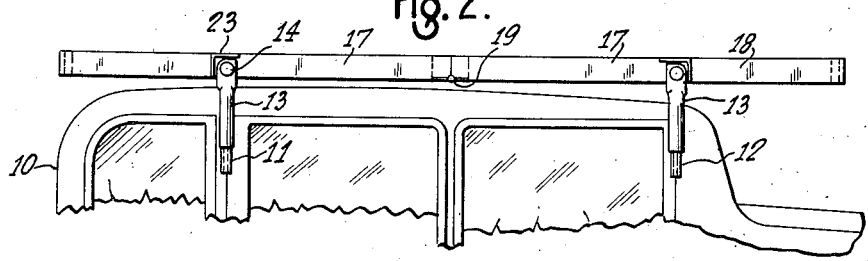
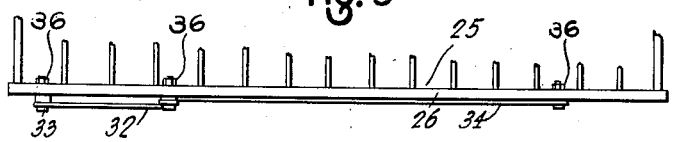
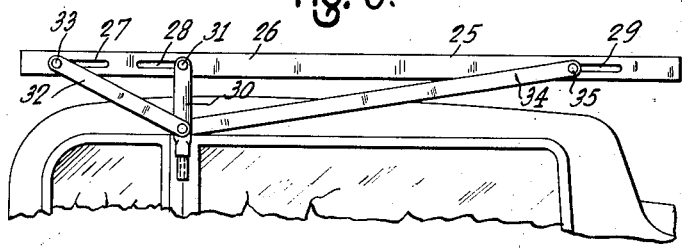
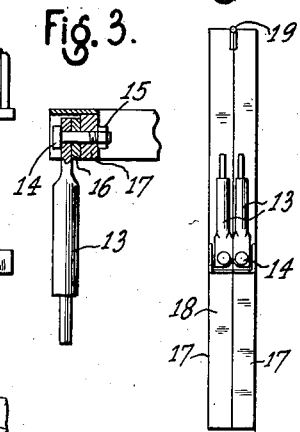
INVENTORS.
C. R. NORTHRUP,
R. C. NORTHRUP.
BY  J. Ledermann
ATTORNEY.

Patented Jan. 26, 1937

2,068,960

UNITED STATES PATENT OFFICE 2,068,960

AUTOMOBILE LUGGAGE CARRIER

Charles Rose Northrup and Robert Charles Northrup, Ozone Park, N. Y.

Application December 18, 1935, Serial No. 54,992

2 Claims. (Cl. 224—29)

This invention relates to luggage carriers for automobiles, and one object is the provision of such a device which is adapted to be adjustably mounted on the roof of an automobile and which is at the same time readily removable when not in use.

The above and other objects will become apparent in the description below, in which characters of reference refer to like-named parts in the accompanying drawing.

Referring briefly to the drawing, Figure 1 is a plan view of the extended carrier.

Figure 2 is a side elevational view of the same mounted on an automobile.

Figure 3 is a cross-sectional view taken on the line 3—3 of Figure 1.

Figure 4 is an end view of the carrier in collapsed position when not in use.

Figure 5 is a fragmentary plan view of one side of the form of carrier shown in Figure 6.

Figure 6 is a side elevational view of a modified form of the carrier mounted on a two-door automobile.

Referring in detail to the drawing, the numeral 10 represents a four-door type of automobile having the upper door-hinge sockets 11 and 12. The reduced ends of posts 13 are set into these sockets after the hinge pins have been removed therefrom. Screw bolts 14 pass through the upper ends of the posts 13, and by means of a nut 15 and a washer 16 the side rails 17 of a luggage carrier 18 are clamped to and supported on the posts 13.

The rails 17 are broken about midway of their length to provide a hinged union 19, and cross-rails 20 join the ends of the opposite rail sections 17. End rails 21 complete the outer frame of the carrier 18. Ribs 22 join the end member 21 of each hinged carrier section with the cross-rail 20 to provide the floor of the carrier. The utility, method of mounting and removing, as well as folding into the collapsed position shown in Figure 4, are all obvious and a detailed explanation thereof is believed superfluous. It is to be noted that an angular sheath 23 protects the upper end of the post 13 and its pivot.

In the form shown in Figures 5 and 6, which is applicable to a two-door automobile 24, the carrier 25 is a unitary rigid member, and each side rail 26 is provided with a pair of end slots 27 and 29 and an intermediate slot 28. The post 30 is substantially similar to the posts 13 and serves the same purpose, but its pin bolt 31 is slidably mounted in the slot 28. A link 32 is pivotally mounted at one end to the lower part of the post 30 and has a pin 33 at its upper end which is slidable in the slot 27. Similarly, a longer link 34 is pivoted at one end to the post 30 and at its other end has a pin 35 slidable in the slot 29. The pins 31, 33, and 35 are similar to the pin 14 of Figure 3, and each is provided with a nut 36 on its threaded end to lock these pins securely in the positions shown in their respective slots. It is to be noted that since the carrier 25 is adapted for use on a two-door car, it is shorter than the carrier 18.

The manner in which the carrier 25 is mounted on the car 24 by inserting the reduced ends of the posts 30 into the hinge sockets, is obvious. When this carrier is removed, it is collapsed by swinging the post 30 in a counter-clockwise direction about its pin 31 until the post aligns with the rail 26. In assuming the latter position, the pin 31 moves to the end of the slot 28 (in a leftward direction), and the pin 33 moves to the right end of the slot 27. Simultaneously, the pin 35 moves to the right end of the slot 29. Thus, when not in use, the entire device lies flat so that it may be readily transported or stored.

Obviously, modifications in form and structure may be made without departing from the spirit of the invention.

I claim:

1. A removable luggage carrier for automobiles comprising a flat carrier member having rails on the sides thereof, each of said rails having a pair of longitudinal end slots and an intermediate longitudinal slot, a post on each side of said carrier having a threaded pin in its upper end slidably mounted in said intermediate slot, said post being adapted to register in the hinge sockets of the automobile doors to support said carrier above the roof of the automobile, a pair of links each mounted at its lower end to the lower part of said post, one of said links being longer than the other, the upper end of said shorter link having a threaded pin slidably mounted in one of said end slots, the upper end of said longer link having a threaded pin slidably mounted in the other of said end slots, nuts on said pins adapted to lock said pins in their respective slots, said carrier being collapsed into a substantially flat mass in one plane by rotating said post into alignment with said rail, which rotation causes said links also to align with said rail.

2. A removable luggage carrier for automobiles comprising a flat carrier member having rails on the sides thereof, each of said rails having a pair of longitudinal end slots and an intermediate longitudinal slot, a post on each side of said carrier having a threaded pin in its upper end slidably mounted in said intermediate slot, said posts being adapted to register in the hinge sockets of the automobile doors to support said carrier above the roof of the automobile, a pair of links each mounted at its lower end to the lower part of said post, the upper end of one of said links having a threaded pin slidably mounted in one of said end slots, the upper end of the other of said links having a threaded pin slidably mounted in the other of said end slots, nuts on said pins adapted to lock said pins in their respective slots, said carrier being collapsed into a substantially flat mass in one plane by rotating said post into alignment with said rail, which rotation causes said links also to align with said rail.

CHARLES ROSE NORTHRUP.
ROBERT C. NORTHRUP.